United States Patent [19]
Vratsanos et al.

[11] Patent Number: 5,414,067
[45] Date of Patent: May 9, 1995

[54] PROCESS FOR REDUCING CURE TIME IN CYCLOALIPHATIC AMINE BASED EPOXY RESINS

[75] Inventors: Menas S. Vratsanos, Breinigsville; Andrea K. Smith, Bethlehem, both of Pa.

[73] Assignee: Air Products and Chemicals, Inc., Allentown, Pa.

[21] Appl. No.: 248,786

[22] Filed: May 25, 1994

[51] Int. Cl.⁶ .................. C08G 59/44; C08G 59/50; C08G 65/00

[52] U.S. Cl. .................. 528/120; 528/122; 528/407; 525/504

[58] Field of Search .......... 528/120, 122, 504, 407

[56] References Cited

U.S. PATENT DOCUMENTS

| | | | |
|---|---|---|---|
| 3,367,911 | 2/1968 | Daum et al. | 528/122 |
| 3,629,181 | 12/1971 | Basel et al. | 260/31.8 E |
| 3,658,728 | 4/1972 | Hoffman et al. | 260/2 N |
| 4,226,737 | 10/1980 | Kluger et al. | 252/182 |
| 4,321,353 | 3/1982 | Kluger et al. | 528/119 |
| 4,946,925 | 8/1990 | Strohmayer et al. | 528/122 |
| 5,264,501 | 11/1993 | Lucas et al. | 528/122 |
| 5,280,091 | 1/1994 | Dubowik et al. | 525/510 |

OTHER PUBLICATIONS

"A New Method for Determining the Network Mechanical Properties of Curing Thermosets", Vratsanos et al, Adhesive Science Review 1, Proc. Annu. Program Rev. 1 Workshop, 5th (1987), 305–319.

Vratsanos, Menas S. and Richard J. Farris, "Network Mechanical Properties of Amine-Cured Epoxies" Polymer Engineering and Science vol. 29, 806–816 (1989).

Vratsanos, Menas S. and Richard J. Farris, "A New Method for Determining Shrinkage Stresses and Properties of Curing Thermosets" Elsevier Science Publishing Co., Inc. 1986, pp.71–80.

Vratsanos, Menas S., and Richard J. Farris, "A Method for Calculating Dynamic Mechanical Properties Using Fourier Transforms of Pulse Deformation Experiments", Journal of Applied Polymer Sciences, vol. 36 403–413 (1988).

*Primary Examiner*—Frederick Krass
*Attorney, Agent, or Firm*—Russell L. Brewer; William F. Marsh

[57] ABSTRACT

This invention relates to an improved method for curing polyepoxide resins at elevated temperature and particularly to a method for reducing the time required to effect cure of thermosetting resins at elevated temperature without sacrificing performance. In the basic process, an epoxide resin comprising a polyglycidyl ether of a polyhydric phenol is mixed with cycloaliphatic amine, e.g., di(4-aminocyclohexyl)methane, di(4-amino-3-methylcyclohexyl)methane, and isophoronediamine in an amount sufficient to effect cure of the polyepoxide resin at an initial temperature and then raised to a final cure temperature. The improvement for reducing the time necessary for cure comprises:

effecting an initial and partial cure of the epoxy resin at a temperature between 60° and 100° C.;

increasing the temperature of the epoxy resin at a point when the ratio of the slope of the equilibrium modulus to the initial slope of the equilibrium modulus in megapascals plotted as a function of time in minutes for the curing epoxy resin as determined by the equation:

$$Eeq = \frac{\int_0^\infty \sigma(t)dt}{\int_0^\infty \epsilon(t)dt}$$

is greater than about 20:1 to a final cure temperature between about 160° and 200° C.; and, then maintaining a final cure temperature until the slope of said equilibrium modulus falls below about 0.1:1. Cure is deemed complete when the slope of the curve falls below 0.1:1.

15 Claims, 7 Drawing Sheets

PROCESS FOR REDUCING CURE TIME IN CYCLOALIPHATIC AMINE BASED EPOXY RESINS

TECHNICAL FIELD

This invention relates to a process for preparing cycloaliphatic amine cured polyepoxide resins.

BACKGROUND OF THE INVENTION

Epoxy resins by their very nature are generally chemically resistant and have utility as coatings, encapsulating agents and composite matrices. Even so, the properties of epoxy resins are also affected by the type of curing agent used for curing the polyepoxide. Aliphatic and aromatic polyamines have been used in the past for curing epoxy resins. Cycloaliphatic amine curatives although permitting rapid, subambient and low temperature cures are often used for elevated cure cycles. A problem with low temperature cure with cycloaliphatic amine based curatives is that the amines often leave residual NH functionality in the cured epoxy resin which may react with ambient carbon dioxide to form surface carbamates. These carbamates lead to water spotting and poor interfacial adhesion and, as a result, the resins may be unsuitable for subsequent coating and architectural applications. Although elevated temperature cure with cycloaliphatic amine based curatives can reduce the possibility of amine exudation in the final product it can also lead to temperature excursions causing charring, degradation and vitrification. Thus, it is important in elevated temperature cure that the conditions are controlled to effect substantially complete cure and minimize the possibility of amine exudation while achieving commercially acceptable performance properties within as short as time as possible.

Representative patents which describe epoxy resins and the utilization of cycloaliphatic amines as curatives are as follows: U.S. Pat. No. 2,817,644 discloses the production of polyepoxides from glycidyl polyethers or polyhydric phenols and curing these polyepoxide resins with hydrogenated aromatic primary and/or secondary amines. Cure can be effected at temperatures ranging from about 15° to 280° C. Small castings are cured for about two hours at 80° to 100° C. and then post-cured for an additional two hours or so at 140° to 225° C. Examples of hydrogenated aromatic amines include p,p'-diaminodiphenylmethane (PACM); hydrogenated p-phenylenediamine; hydrogenated meta-phenylenediamine and hydrogenated benzene triamine.

U.S. Pat. No. 3,658,728 discloses a process for preparing moldings from polyepoxides and polyamines wherein a liquid polyamine/alkylphenol adduct is cured. Examples of polyamines suited for effecting cure of the polyepoxide resin, include aliphatic, cycloaliphatic, aromatic and heterocyclic polyamines. Cycloaliphatic polyamines such as diaminocyclohexane, 4,4'-diaminodicyclohexylmethane, and 2,2-bis-(4-aminodicyclohexyl)propane are shown. The Patentees disclose curing glycidyl ethers of polyphenols using 4,4'-diaminodicyclohexylmethane at temperatures of 60° C. for about 15 hours.

U.S. Pat. No. 5,264,501 discloses curing epoxide resins utilizing bridged cycloaliphatic diamines. The cure cycle disclosed for curing the epoxy resin involved an initial curing of two hours at 80° C., followed by 3 hours at 150° C. Cycloaliphatic amines tested include: dimethylbicyclohexylamine, methylenedi(cyclohexylamine) or PACM and dimethylmethylenedi(cyclohexylamine).

Japanese Publication 53-9639 discloses a hardenable epoxy resin composition, the hardener generally consisting of a hydrogenated aniline/formaldehyde condensate. An elevated temperature cure consisting of two hours at 70° C. followed by five hours at 120° C. was used.

U.S. Pat. Nos. 4,226,737 and 4,321,353 disclose epoxy curatives which are methylene bridged polycycloaliphatic polyamines represented by the structural formula:

wherein x and y are from 0–2 and the sum of x plus y is from 1 to 4. Typically the curative consists essentially of 50 to 75% of the methylene bridged tricyclohexyltriamine and from 15 to 30% of the tetracyclohexyl tetramine.

U.S. Pat. No. 3,629,181 discloses various cycloaliphatic and cycloaliphatic-aliphatic di-primary amines for use in preparing adducts as curing agents for polyepoxide resin systems. Representative amines include 1,4-diamino-3,6-diethylcyclohexane; 2,2-di(4-aminocyclohexyl)propane which is commonly referred to as hydrogenated bisaniline A and 3-aminomethyl-3,5,5-trimethyl-1-cyclohexylamine, which is commonly referred to as isophoronediamine.

U.S. Pat. No. 4,946,925 discloses various bridged bis(cyclohexylamine) derivatives as curing agents. Each cyclohexylamine group has two alkyl groups, where the alkyl groups are in the 2 and the 5 positions and the amine groups are in the 4 position. Specific curing agents include 2,2',5,5'-tetramethylmethylenedicyclohexylamine and 2,2',5,5'-tetraethylmethylenedicyclohexylamine.

U.S. Pat. No. 5,280,091 discloses the cure of epoxy resins using a mixture methylene bridged poly(cyclohexyl-aromatic)amines. Cure is effected at 80° C. for 2 hours followed by reaction at 150° C. for 3 hours.

SUMMARY OF THE INVENTION

This invention relates to an improved process for curing polyepoxide resins at elevated temperature and particularly to a process for reducing the time required to effect cure of thermosetting resins at elevated temperature without sacrificing performance. In a basic process for elevated temperature cure, an epoxide resin comprising a polyglycidyl ether of a polyhydric phenol is mixed with a cycloaliphatic amine in an amount sufficient to effect cure of the polyepoxide resin. The polyepoxide is partially cured at an initial temperature with the temperature being raised and final cure being effected at a final cure temperature for a time sufficient to obtain desired properties. The improvement for reducing the time necessary for elevated temperature cure comprises:

effecting an initial and partial cure of the epoxy resin at a temperature between 60° and 100° C., generally 70°–90° C. (The slope of the equilibrium modulus (Eeq) in megapascals plotted as a function of time in minutes for the curing epoxy resin as determined by the equation:

$$Eeq = \frac{\int_0^\infty \sigma(t)dt}{\int_0^\infty \epsilon(t)dt}$$

wherein Eeq is equilibrium modulus, $\sigma(t)$ is stress response, $\epsilon(t)$ is strain history, (t) is time and dt is time increment will typically be greater than 0.02:1 during this initial cure;)

increasing the temperature of the epoxy resin at a point when the ratio of the slope of the equilibrium modulus to the initial slope of the equilibrium modulus is greater than about 20:1, preferably above 100:1 or alternatively when the absolute slope is between 0.3 to 0.5:1, to a final cure temperature between about 160° and 200° C.; and, then maintaining a final cure temperature until the slope of said equilibrium modulus falls below about 0.1:1. Cure is deemed complete when the slope of the curve falls below 0.1:1, generally below about 0.05:1. The temperature may be raised within 10 minutes of the point where the ratio of the slope of the equilibrium modulus is greater than 100:1.

Typically, polyepoxide resins can be cured by this process in about 1 to 2 hours depending on the temperatures selected in contrast to conventional cure schedules of about 3 to 5 hours. A typical cure schedule consists of about 20 to 40 minutes at initial temperatures of 60°–90° C. followed by cure for 0.5 to 2.5, generally 1–2 hours, at 160°–200° C., typically, 165° to 185° C.

There are several advantages associated with the process of this invention, namely that of utilizing impulse viscoelasticity in designing an elevated temperature cure schedule for a polyepoxide resin utilizing a cycloaliphatic amine curative. These advantages include:

an ability to enhance volume throughput of epoxy products due to the reduced time needed to cure the epoxy resin;

an ability to minimize and reduce resin loss due to rapid viscosity build during cure;

an ability to obtain excellent cures and thereby minimize amine exudation resulting from an incomplete cure;

an ability to reduce the possibility of excessive exotherms and temperature excursions thereby minimizing the opportunity for charring and degradation of the epoxy resin; and an ability to generate epoxy compositions having excellent thermal properties, chemical resistance, and mechanical properties including fracture toughness, flexibility, elongation, strength and so forth required for composites and structural applications.

DETAILED DESCRIPTION OF THE INVENTION

Polyepoxides which can be cured using the process of this invention include are solid and liquid polyepoxides having more than one epoxy group per molecule with the epoxy group typically being a terminal 1,2-epoxy group. The polyepoxides are well known and representative polyepoxides are described in U.S. Pat. Nos. 3,351,610, 4,447,586 and 4,946,925 which are incorporated by reference. Examples of polyepoxides which are conventionally used include those which are based upon phenols and aliphatic polyols. Representative phenolic polyepoxides typically used include glycidyl polyethers of polyhydric phenols derived from a polyhydric phenol and epihalohydrin. The resulting polyepoxides generally will have an epoxide equivalent weight ranging up to about 200. Epihalohydrins used in preparing the polyepoxides include epichlorohydrin and epibromohydrin and polyhydric phenols include resorcinol, hydroguinone, di(4-dihydroxyphenyl)methane, commonly referred to as bisphenol F; and, di(4-hydroxyphenyl)propane, commonly referred to as hisphenol A and novolacs where the phenolic groups are bridged via methylene groups. Of these polyhydric phenols, those based upon bisphenol A are the most common and preferred in the practice of this invention.

The polyepoxides can be cured in conventional manner by effecting reaction with cycloaliphatic polyamines, e.g., methylene bridged polycyclohexylamines. By the term cycloaliphatic amine it is meant to include cycloaliphatic amines and mixed cycloaliphatic-aromatic derivatives, e.g., methylene bridged aminobenzyl-cyclohexylamines. Examples of cyclohexylamines include di(4-aminocyclohexyl)methane (PACM); di(3-methyl-4-aminocyclohexyl)methane; di(3,5-methyl-4-aminocyclohexyl)methane; 4-aminocyclohexyl-4-hydroxycyclohexylmethane and isophoronediamine. Examples of mixed cycloaliphatic-aromatic amines include 4-(4′-aminobenzyl)cyclohexylamine; (ABCHA); 2,4-di(4-aminocyclohexylmethyl)- cyclohexylamine; 2,4-di(4-aminocyclohexylmethyl)aniline; 4,4'-di(4-cyclohexylmethyl)dicyclohexylamine; and, partially hydrogenated trimethylenetetraaniline and analogs thereof and hydrogenated bisaniline A and hydrogenated bisaniline P. Collectively the above cyclohexylamines are referred to as MPCA as noted in U.S. Pat. No. 5,280,091 and such cycloaliphatic-/aromatic amines are incorporated by reference.

In effecting cure of the epoxy resin it is often preferable to use a mixture of cycloaliphatic amines, particularly a mixture of cyclohexylamines. A polyamine mixture which has been found to be excellent comprises PACM and MPCA or PACM and ABCHA where the PACM is present in an amount of from 50–80% by weight PACM and the balance, i.e., 20–50% MPCA or ABCHA. A representative MPCA mixture is as follows:

2–10% di(4-aminocyclohexyl)methane;
0.5–2% 4-aminocyclohexyl-4-hydroxycyclohexyl methane;
5–17% 4-(4'-aminobenzyl)cyclohexylamine;
5–25% 2,4-di(4-aminocyclohexylmethyl)cyclohexylamine;
35–55% 2,4-di(4-aminocyclohexylmethyl)aniline;
0–15% 4,4'-di(4-cyclohexylmethyl)cyclohexylamine; and,
3–8% partially hydrogenated trimethylenetetraaniline and analogs thereof.

Typically the amount of cycloaliphatic amine curative which is reacted with the polyepoxide will range from a level of 0.6 to 1.7 times the stoichiometric or equivalent amount of polyepoxide resin present. Generally, the level of cycloaliphatic amine to polyepoxide is from about 0.9 to 1.1 times the stoichiometric amount, stoichiometric being one equivalent weight of epoxide per equivalent weight of amine hydrogen.

It has been found that the analytical technique of impulse viscoelasticity can be utilized to develop a reduced cure schedule for epoxy resins. Basically, the analytical technique of impulse viscoelasticity provides an indication as to point where there is "dead time" in a cure cycle and by determining the point where there is "dead time" in the cure cycle, one can take appropriate and prompt action, namely, increasing temperature at a desired rate and eliminate the dead time experienced in the practice of conventional cure cycles. The application of impulse viscoelasticity not only assists in reducing the cure schedule by highlighting the "dead time" in the cure cycle, it also can eliminate exotherm spikes in the cure cycle which result in poorer physical properties for the resulting cured epoxy resin. Often, in an elevated temperature cure where there is an exotherm spike during cure, glassiness, excessive brittleness and other forms of degradation may result within the resulting cured epoxy resin.

Impulse viscoelasticity is a relatively recent analytical technique which measures equilibrium modulus, viscosity and other properties as functions of time. Equilibrium modulus is expressed by the formula:

$$Eeq = \frac{\int_0^\infty \sigma(t)dt}{\int_0^\infty \epsilon(t)dt}.$$

In conventional terms, equilibrium modulus is the ratio of the stress response of the sample to an applied strain; stress is the internal resistance of the epoxy resin to the external deformation applied thereto, while strain refers to the deformation applied to the epoxy resin. Further information regarding the technique of impulse viscoelasticity is described in the articles, "Network Mechanical Properties of Amine-Cured Epoxies," by Menas S. Vratsanos and Richard J. Farris, *Polymer Engineering and Science,* Vol. 29, 806–816 (1989); "A New Method for Determining Shrinkage Stresses and Properties of Curing Thermosets," by Menas S. Vratsanos and Richard J. Farris, publ. by *Elsevier Science Publishing Co., Inc.,* 1986 pages 71–80; and "A Method for Calculating Dynamic Mechanical Properties Using Fourier Transforms of Pulse Deformation Experiments," by Menas S. Vratsanos and Richard j. Farris, *Journal of Applied Polymer Science,* Vol. 36, 403–413 (1988), which articles are incorporated by reference.

Figure 1:
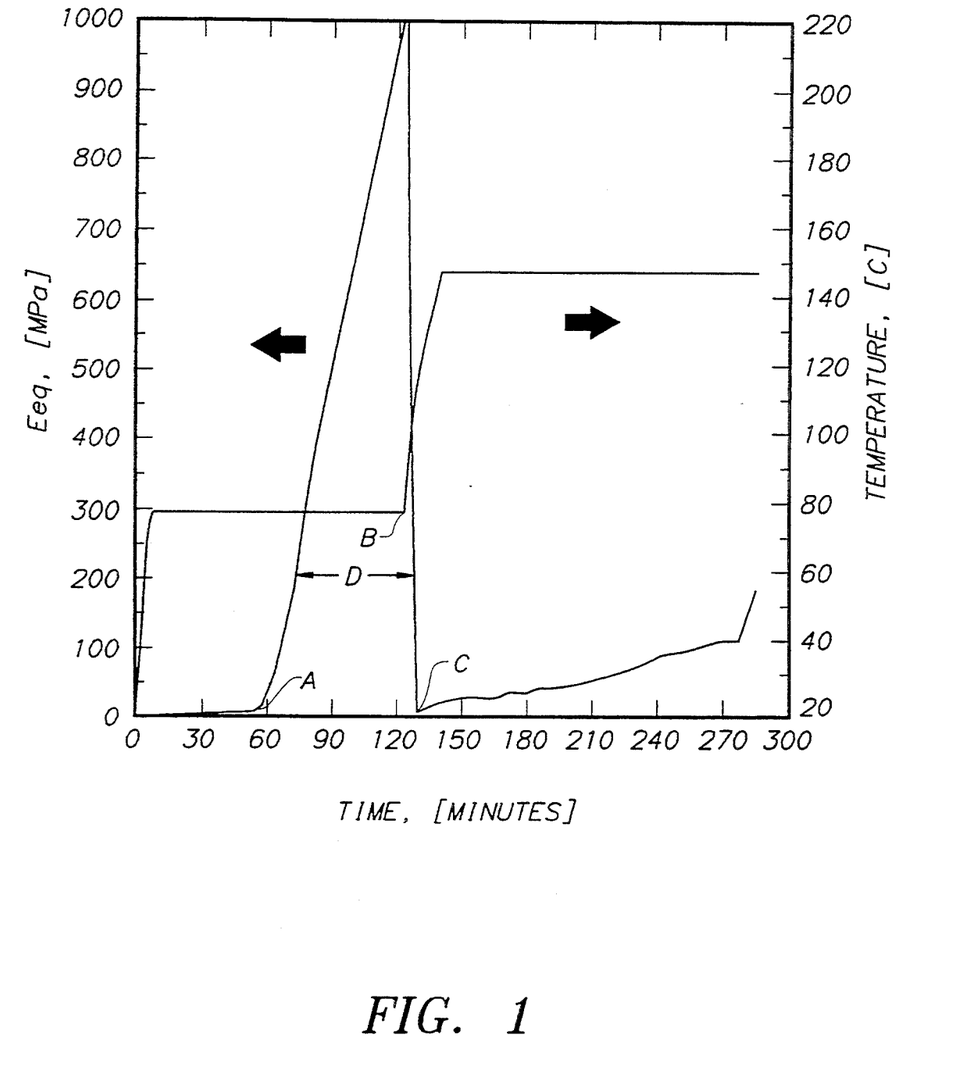
FIG. 1 is a plot of equilibrium modulus and temperature as functions of time as determined by impulse viscoelasticity for a commercial epoxy cure schedule of 2 hours at 80° C. and 3 hours at 150° C. using a 50% PACM/50% MPCA containing cycloaliphatic amine curative and Epon 826.
Figure 2:
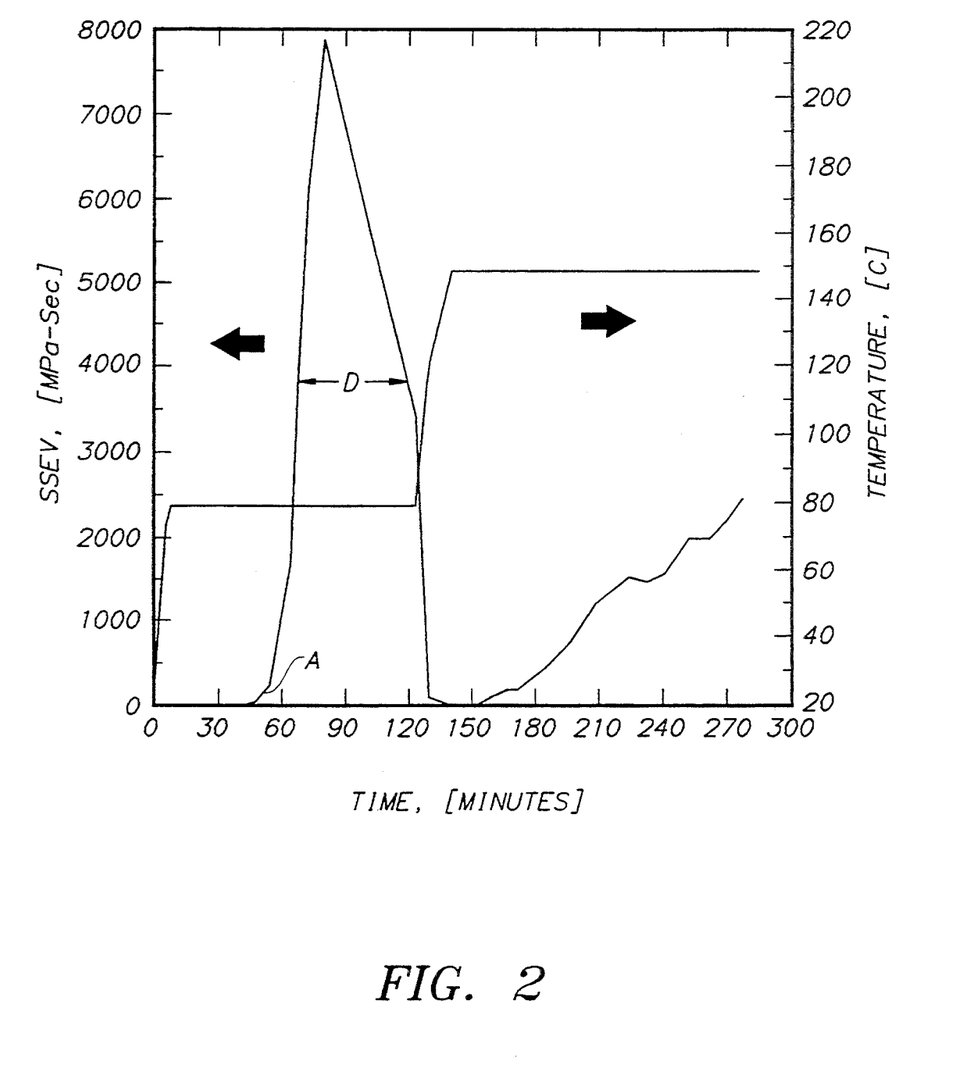
FIG. 2 is a curve of steady state elongational viscosity (SSEV) and temperature as functions of time for the epoxy resin of FIG. 1 cured with the PACM containing cycloaliphatic amine by the cycle described.
Figure 3:
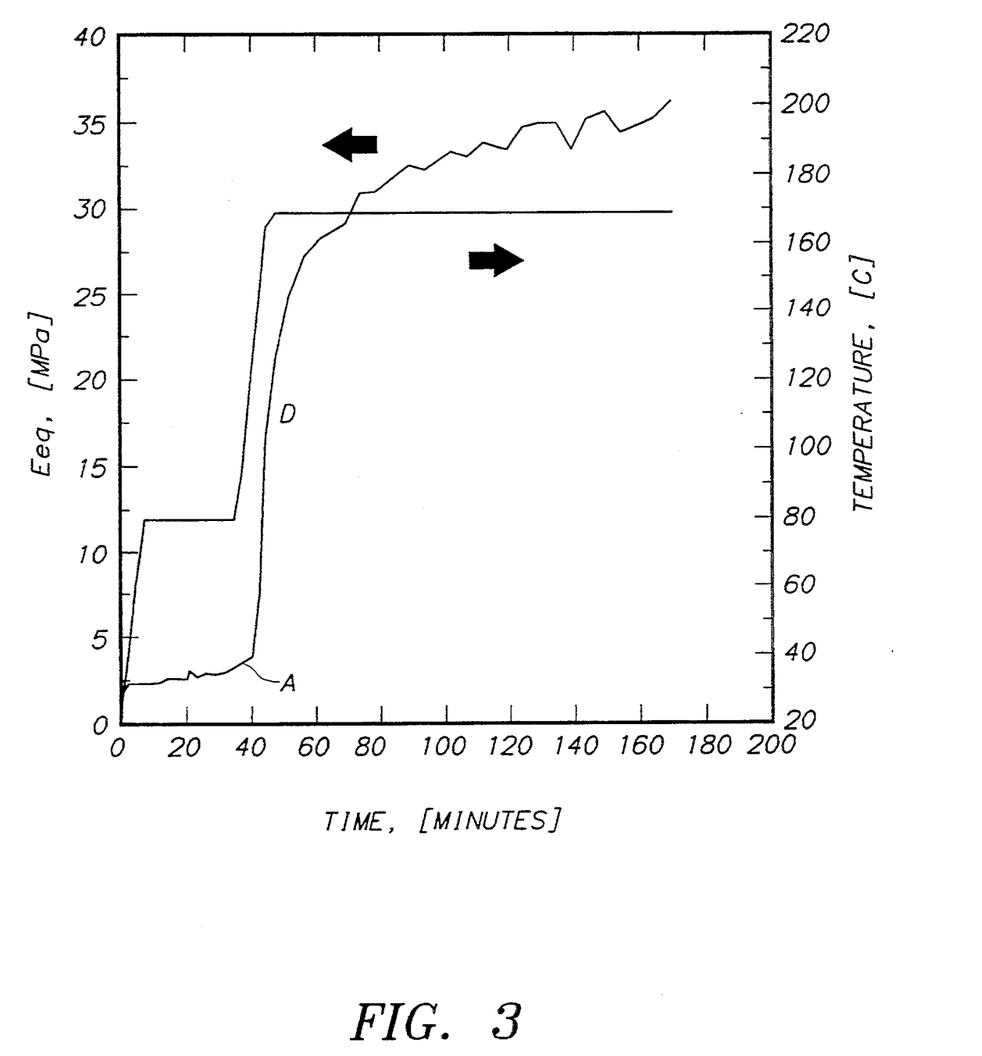
FIG. 3 displays curves of equilibrium modulus and temperature as functions of time for an Epon 826 epoxy resin cured with a 50% PACM/50% containing cycloaliphatic amine, cured at 80° C. for 0.5 hours and 2 hours at 170° C.

To facilitate an understanding of the application of impulse viscoelasticity for the development of a cure cycle for an epoxy resin using a cycloaliphatic amine curative, reference is made to FIGS. 1 and 3. These figures show the development of equilibrium modulus as a function of time in minutes for a cycloaliphatic amine-epoxy resin mixture. The equilibrium modulus in megapascals is plotted on the ordinate with time in minutes on the abscissa. The cure described by FIG. 1 was conducted for 2 hours at 80° C. followed by 3 hours at 150° C. with the temperature being raised from 25° to 80° C. and 80° to 150° C. at a rate of about 10° C. per minute. As shown, cure begins with a slight increase in modulus as a function of time at 80° C. At about 45 minutes the slope of the Eeq curve at point A increases dramatically, i.e., the slope is greater than about 10:1 and remains high for an extended period of time under isothermal conditions. The ratio of the slope may be in excess of 100:1. When the temperature of the epoxy resin is increased at about 120 minutes, this slope falls dramatically and begins to increase, the slope being approximately 0.6:1 at 150° C. Surprisingly, under isothermal conditions, even though the equilibrium modulus curve suggests an enhanced cure rate, that is not the case. Generally the equilibrium modulus, as determined by impulse viscoelasticity, is by itself insufficient for a complete understanding of where cure is most rapid. It can identify a point where little cure is effected. But, when one couples the equilibrium modulus data with a curve of steady state elongational viscosity (SSEV), as shown in FIG. 2, one can determine the degree and rate of cure. The rapid increase in Eeq and the high SSEV data after 45 minutes at 80° C. indicate vitrification of the cycloaliphatic amine-epoxy mixture. Thus, heretofore, when cure was effected under isothermal conditions for an extended period of time, vitrification without substantial cure was the end result, not rapid cure as might have been thought.

When at point B, i.e., at 120 minutes, the temperature is raised gradually from 80° to 150° C., the equilibrium modulus, as noted at point C, continues to increase until the cure schedule is complete at the end of 300 minutes. Cure, however, may not be complete depending on the degree of vitrification, etc., that took place because of the failure to raise temperature at an appropriate time.

It has been determined, then, that the equilibrium modulus identifies a "dead time," D, in a given cure cycle where essentially no cure is effected. Thus, if one continues the cure cycle at 80° C. for a period of 2 hours, as has been practiced commercially over the years, essentially no cure is effected between about 45 minutes and 120 minutes.

The use of impulse viscoelasticity as an analytical technique can also identify conditions where the magnitude of a temperature increase during cure to a final cure temperature may be too low as, for example, through gradual temperature increase followed by an intermediate isothermal cure. Another curve similar to that formed a point A may result and another dead time would have been generated.

Figure 4:
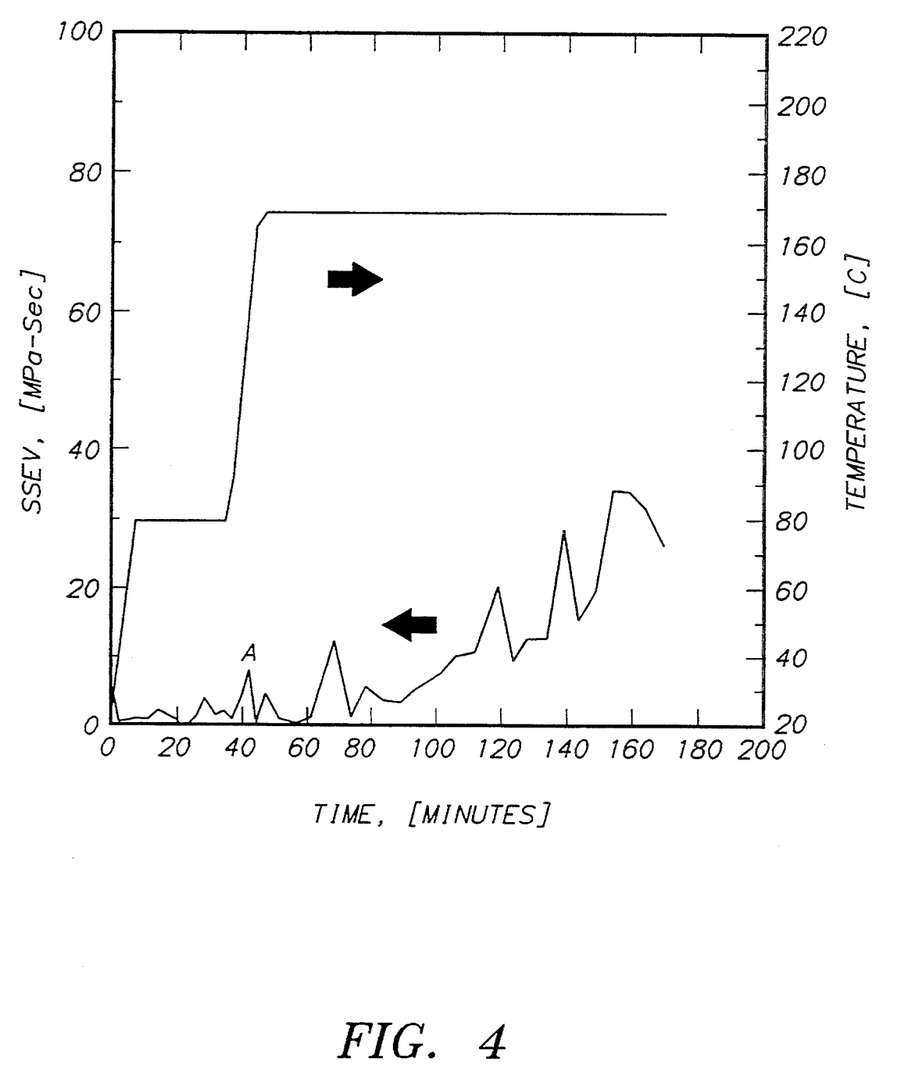
FIG. 4 is a curve of steady state elongational viscosity and temperature as functions of time for the epoxy resin of FIG. 3 cured by the cycle described.
Figure 5:
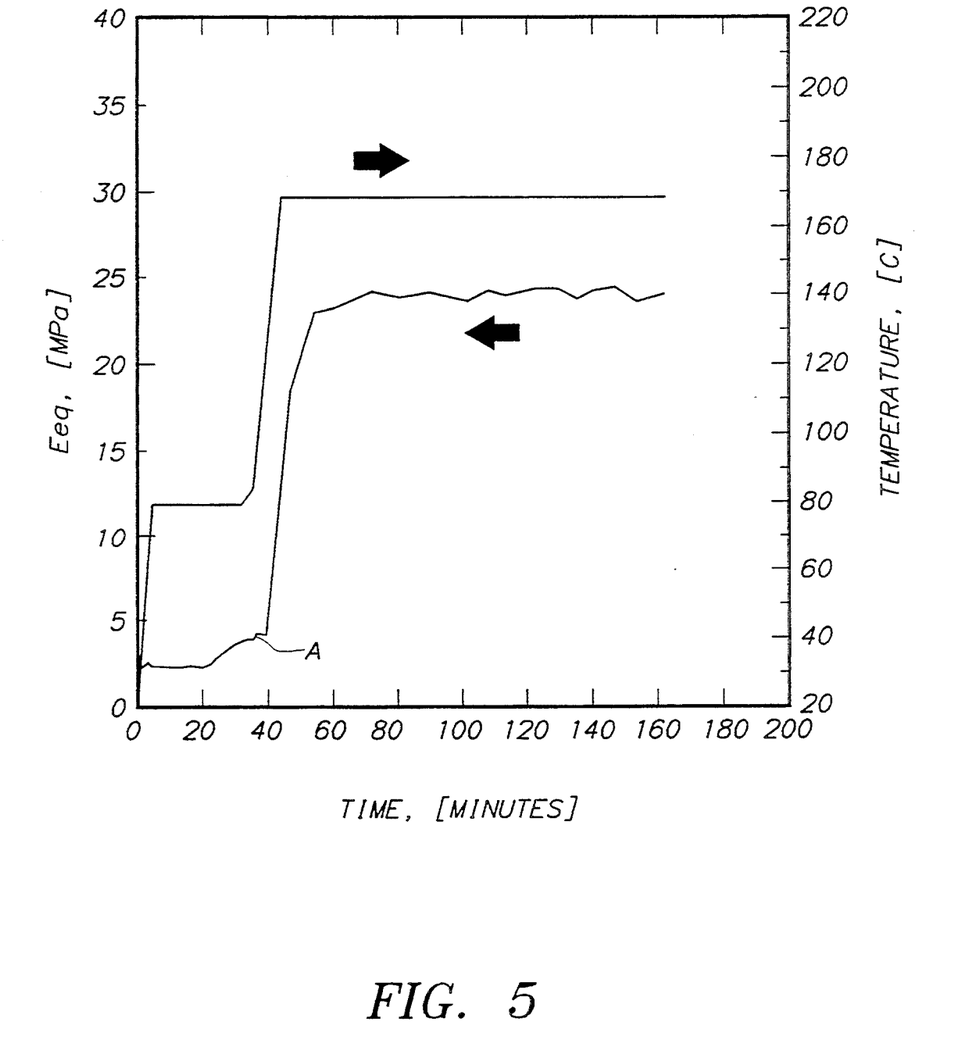
FIG. 5 compares curves of equilibrium modulus and temperature as functions of time for an Epon 826 epoxy resin cured with isophoronediamine at 80° C. for 0.5 hours and 2 hours at 170° C.
Figure 6:
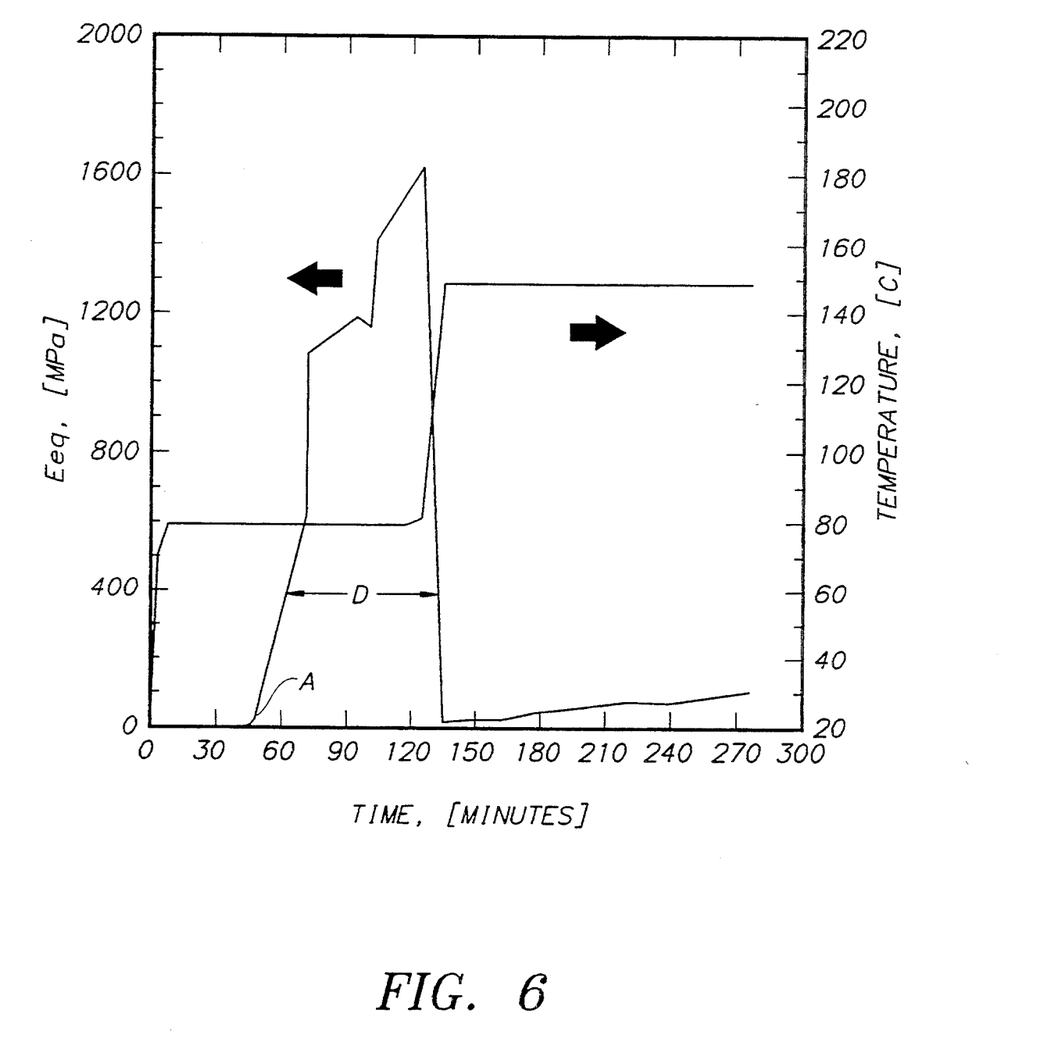
FIG. 6 is a plot of equilibrium modulus and temperature as functions of time as determined by impulse viscoelasticity for a commercial epoxy cure schedule of 2 hours at 80° C. and 3 hours at 150° C. using an isophoronediamine curative and Epon 826.
Figure 7:
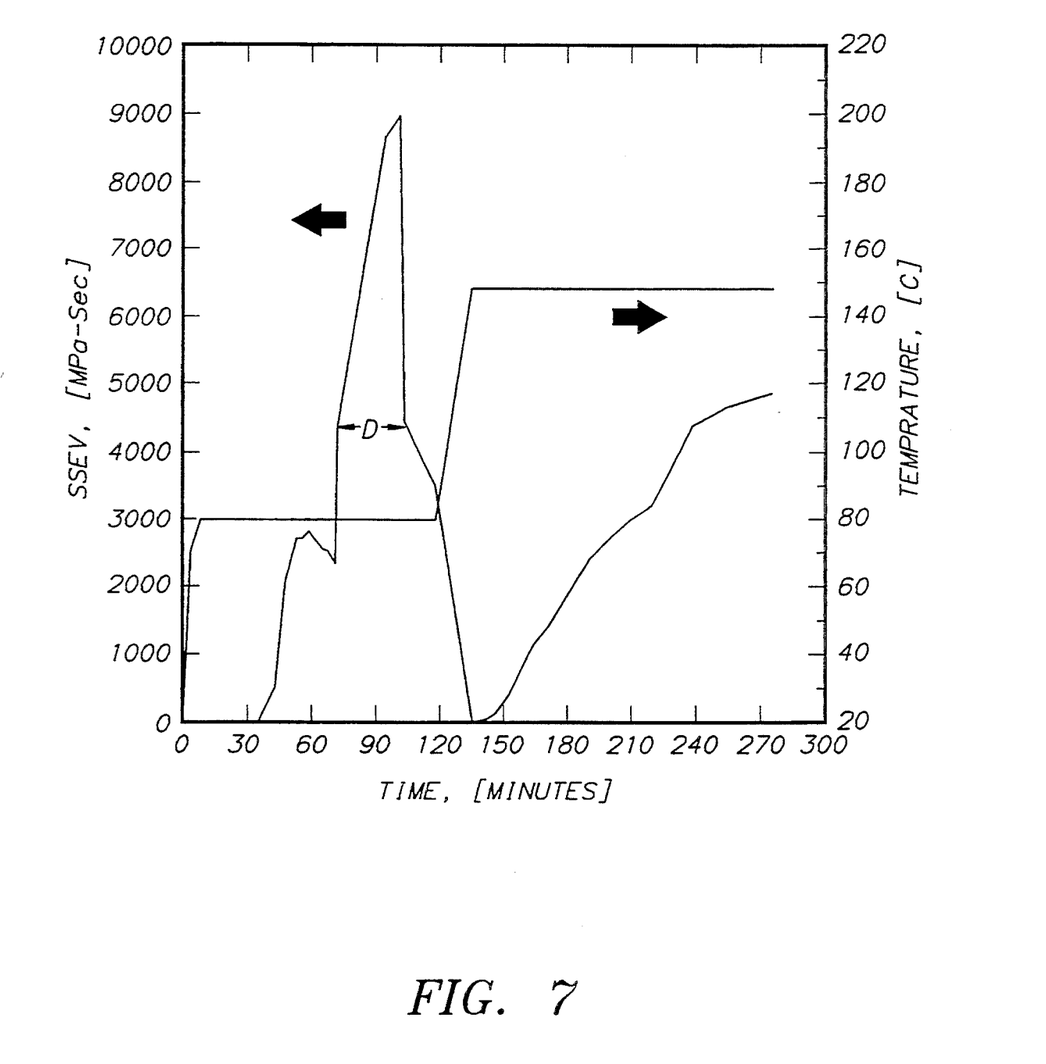
FIG. 7 is a curve of steady state elongational viscosity (SSEV) and temperature as functions of time for the epoxy resin of FIG. 6 cured with isophoronediamine.

FIGS. 3 and 4 illustrate the application of impulse viscoelasticity and utilization of equilibrium modulus and steady state elongational viscosity to develop and greatly reduce the cure schedule time without sacrificing properties for an epoxy resin using a mixture of PACM and other cycloaliphatic amines as the curing agents. As was done with the epoxy resin in FIG. 1 an initial cure was effected at 80° C. A positive slope to the equilibrium modulus curve, as in the cure of FIG. 1, was established. At point A, the slope of the equilibrium modulus increases dramatically. But, in contrast to the cure schedule utilized in FIG. 1, the increase in equilibrium modulus is because the temperature was increased from 80° to 170° C. at a rate of 10° C per minute. With this gradual increase in temperature, e.g., 3°-20° C., preferably 5° to 10° C. per minute, cure accelerates through this region. Cure continues to build as indicated by the positive slope of the equilibrium modulus-time data to final cure temperature, i.e., a temperature typically from 5°-20° C., preferably 7°-15° C. above the maximum or ultimate Tg of the epoxy resin. The rapid increase in Eeq is directly related to a rapid increase in the degree of cure since this reduced cure schedule is not complicated by vitrification; the absence of vitrification is evidenced by the low SSEV data during cure. At the final cure temperature, the slope of the equilibrium modulus-time data decreases as cure proceeds; cure is deemed complete when the slope falls below 0.1:1, preferably below about 0.05 to 0.02:1. The time allotted for cure after the final cure temperature has been reached is more a function of the properties desired in the final product. However, properties remain excellent. As shown by the equilibrium modulus and steady state elongational viscosity curves, it is believed a reason for enhanced properties is that a retarding network e.g., epoxy vitrification in the dead space leading to crosslink and network cure retardation, was not established because of the appropriate temperature response.

Thus, as can be gleaned from FIGS. 1 and 3, the cure cycle is greatly reduced through the optimal timing of the increase in the elevated temperature cure. And as noted, it also avoids the problem associated with excessive temperature excursions during the cure cycle. As for example if the temperature is increased substantially prior to the slope transition at point A, there may be charring and degradation of the resulting epoxy resin.

The keys to reducing the cure schedule without sacrificing ultimate physical properties lies in the appropriate timing of the temperature increase, the rate of temperature increase, the final cure temperature, and the duration of cure at final cure temperature. It has been found that the temperature should be increased from an initial cure temperature of about 60°-100° C., generally between 70° and 90° C. at a point generally immediately prior to the point where the ratio of the slope of the equilibrium modulus curve to that slope immediately prior is greater than 20:1. Alternatively, the absolute slopes when the temperature should be increased may range from 0.3 to 0.5:1. For example, with the PACM containing curative, the slope of the modulus prior to point A in FIG. 1 is about 0.06:1. After point A, the slope is greater than 10:1. By increasing temperature at a rate typically from 5°-10° C. per minute within a time period of about 5-10 minutes on either side of point A, not only can one eliminate the dead time associated in conventional cure cycles one can also achieve a better and more rapid cure due to reduced polymer vitrification due to improperly low cure temperatures.

As a last point, the temperature is finally increased to a level of 160° to 200° C., preferably 165°-185° C., which is about 10°-30° C., preferably 15°-20° C. above the ultimate Tg. By curing the epoxy resin at such unconventionally high temperatures, one drives the cure substantially to completion and reduces the glassy character of the curing resin. As the slope of the equilibrium modulus-time data drops, generally below about 0.1:1, preferably below 0.05:1 cure is deemed complete.

One of the advantages associated with the use of impulse viscoelasticity in determining the cure schedule for epoxy resins as compared to, for example the measurement of residual exotherm as a function of time via differential scanning calorimetry (DSC), is that it provides more accurate identification of the cure rate properties of the epoxy resins during cure at elevated temperature. Residual exotherms in highly cured systems tend to be inaccurate at the high end of the cure cycle. DSC is effective for determining parameters for the partially cured systems but the residual exotherm approach does not permit one to readily define a point at which to increase the temperature for accelerating cure through the "dead time" as denoted in FIGS. 1 and 3 and others. Conventional diluents such as monoepoxide components, accelerators, plasticizer, fillers, glass and carbon fibers, pigments, solvents, etc. used in formulating epoxy coatings, mold compositions, lacquers, etc. can be used. Selection and amount of these additives is at the option of the formulator. Representative accelerators which may be used, although not mandatory, include: boron trifluoride amine complexes and metal fluoroborate systems, e.g. copper fluoroborate; substituted phenolics, and tertiary amines, such as imidazole, 2,4,6-tri(dimethylaminomethyl)phenol, and benzyldimethylamine.

The following examples are intended to illustrate various embodiments of the invention and are not intended to restrict the scope thereof.

EXAMPLE 1

Preparation of Epoxy Resins

Epoxy resins were prepared in a conventional manner using various cycloaliphatic amine curing agents and differing cure schedules. The formulations were made with commercial epoxy resins, namely Epon Resin 826 (a trademark) having an epoxide equivalent weight of approximately 182. The formulations were cured with stoichiometric levels of curing agents.

The polyepoxides and amine curatives as described above were mixed at temperatures between 25° and 50° C. Entrained air was removed by one of two methods: 1) by applying a vacuum for about 1-15 minutes until foaming stopped indicating most of the air had been removed, or 2) by centrifuging the mixture of polyepoxide and curative until it was clear. After removal of the entrained air, the mixture of amine curative and polyepoxide was poured into ⅛ inch molds preheated to a specified temperature for the elevated cure systems. The filled molds were placed in a circulating air oven and cured at that temperature for a specified time and optionally at a higher temperature as specified. The temperature was increased at a rate of 11° C. per minute for the 150° C. cure and 13° C. for the 170° C. cure. After cure the molds were allowed to cool to room temperature and the ⅛ inch castings were removed. Samples of the resulting resin were prepared for mechanical and physical testing. The mechanical and physical properties then were determined by standard methods. The property results of a conventional cure (2 hours at 80° C. followed by 3 hours at 150° C.) are set forth in Table 1. The property results of two reduced cure schedules are set forth in Table 2. The two reduced cure schedules are given by 0.5 hours at 80° C. followed by 1 hour at 170° C. and 0.5 hours at 80° C. followed by 2 hours at 170° C.

TABLE 1

PROPERTIES OF DGEBA HEAT CURED SYSTEMS
CONVENTIONAL CURE: 2 HRS @ 80° C.,
3 HRS @ 150° C.

| PROPERTIES | AMICURE PACM | MPCA | PACM MPCA* 50/50 | PACM MPCA 80/20 |
|---|---|---|---|---|
| Tg, °C. | 158 | 159 | 162 | 163 |
| MECHANICAL PROPERTIES | | | | |
| TENSILE STRENGTH (MPa) | 78.6 | 68.3 | 72.4 | 75.8 |
| TENSILE MODULUS (MPa) | 2310 | 2710 | 2670 | 2570 |
| % ELONGATION | 7.4 | 4.0 | 4.9 | 6.9 |
| FRACTURE TOUGHNESS, $K_{IC}$ (MPa $\sqrt{m}$) | 0.78 | — | 0.75 | 0.78 |

DGEBA polyepoxide is a diglycidyl ether of bisphenol A epoxy having an epoxide equivalent weight between 176 and 192.
AMICURE PACM is a trademark of Air Products and Chemicals, Inc. identifying PACM.
*MPCA represents am mixture of hydrogenated methylene bridged poly(cyclohexylamines) of the following approximate proportions:
5.0% di(4-aminocyclohexyl)methane; (PACM)
0.5% 4-aminocyclohexyl-4-hydroxycyclohexyl methane;
5.4% 4-(4'-aminobenzyl)cyclohexylamine; (ABCHA)
17.9% 2,4-di(4-aminocyclohexylmethyl)cyclohexylamine;
49.8% 2,4-di(4-aminocyclohexylmethyl)aniline;
6.5% 4,4'-di(4-cyclohexylmethyl)dicyclohexylamine;
7.5% partially hydrogenated trimethylenetraaniline and analogs thereof; and
7.4% non elutables.
50/50 refers to 50% by weight PACM and 50% MPCA.
80/20 refers to 80% by weight PACM and 20% MPCA.

TABLE 2

PROPERTIES OF DGEBA HEAT CURED SYSTEMS
REDUCED CURE: 0.5 HRS @ 80° C.,
1-2 HRS @ 170° C.

| PROPERTIES | AMICURE PACM | MPCA | PACM MPCA* 50/50 | PACM MPCA 80/20 |
|---|---|---|---|---|
| Tg, °C. | 152 | 176 | 156 | 155 |
| ONE HOUR AT 170° C. | | | | |
| MECHANICAL PROPERTIES | | | | |
| TENSILE STRENGTH (MPa) | | | 76.5 | |
| TENSILE MODULUS (MPa) | | | 2510 | |
| % ELONGATION | | | 5.6 | |
| FRACTURE TOUGHNESS, $K_{IC}$ (MPa $\sqrt{5m}$) | | | 0.77 | |
| TWO HOURS AT 170° C. | | | | |

TABLE 2-continued

PROPERTIES OF DGEBA HEAT CURED SYSTEMS
REDUCED CURE: 0.5 HRS @ 80° C.,
1-2 HRS @ 170° C.

| PROPERTIES | AMICURE PACM | MPCA | PACM MPCA* 50/50 | PACM MPCA 80/20 |
|---|---|---|---|---|
| MECHANICAL PROPERTIES | | | | |
| TENSILE STRENGTH (MPa) | 78.6 | 62.1 | 74.5 | 75.8 |
| TENSILE MODULUS (MPa) | 2410 | 2760 | 2740 | 2620 |
| % ELONGATION | 6.6 | 2.7 | 4.8 | 6.2 |
| FRACTURE TOUGHNESS, $K_{IC}$ (MPa $\sqrt{m}$) | 0.74 | — | 0.66 | — |

The above results show that comparable results can be achieved through the utilization of the reduced cure cycle of 0.5 hours at 80° C. followed by 2 hours at 170° C. as compared to the 2 hour cure cycle at 80° C. followed by 3 hours at 150° C. In general the physical properties are substantially equivalent in terms of tensile strength and modulus. The percent elongation is slightly less for the epoxy resin cured with the reduced cure cycle than with the extended cure cycle.

It is believed that the reduced elongation is due to the fact that there is a greater degree of cure in the epoxy resin even though cure was conducted in a shorter period of time. The data for the 50/50 amine mixture cured for 0.5 hours at 80° C. followed by 1 hour at 170° C. indicate a higher elongation than the two hour cure at 170° C. and that observed for the conventional cure schedule. The tensile strengths for the 50/50 samples are comparable while the tensile modulus is a bit lower for the sample cured one hour at 170° C. These data indicate that it is possible to tailor mechanical properties by controlling the cure time at elevated temperatures. Equivalent percent elongation most likely would be achieved if the reduced cure schedule were effected at a final cure temperature of 150° C. Alternatively, one can further adjust the cure cycle time of the epoxy resin at 170° C. to achieve similar results to the conventional cure cycle, as evidenced by the data even though the epoxy resin was already cured for a shorter time than the epoxy resin cured commercially.

The results also show that the methylene bridged cyclohexylamines and methylene bridged aminobenzylcyclohexylamines can be used alone or as a mixture to cure epoxy resins in a time substantially shorter time than that used commercially while achieving comparable physical properties.

EXAMPLE 2

Impulse Viscoelasticity Data: Conventional Cure of An Epoxy Resin

Impulse viscoelastic data were generated as a function of time using a conventional commercial cycle of 2 hours at 80° C. followed by 3 hours at 150° C. Samples were prepared by filling a sample assembly with a degassed 50/50 PACM/MPCA Epon Resin 826 mixture and loading the assembly into the environmental chamber of a rheometer. Small deformations were applied to the sample throughout cure. The stress and strain data from each deformation were collected and used to calculate the impulse viscoelastic data. The Eeq results are shown in FIG. 1; FIG. 2 sets forth steady state elongational viscosity data. Data were taken approximately every 1–3 minutes and the development of cure measured by impulse viscoelasticity. The duration of the deformation was approximately 10 seconds. (If samples are taken on a less frequent basis, and the duration of the deformation extended significantly, aberrations in the slope of the equilibrium modulus time data may result and one may not be able to selectively identify an appropriate ratio of the slopes near point A). The slopes of the Eeq-time data should be measured on a 5–15 minute time scale so as to avoid any erroneous slope calculations associated with noise fluctuations in the Eeq data. The scale used in FIG. 3 was different from that of FIG. 1 for the purpose of highlighting the slope change of the equilibrium curve when the rate of cure begins to decrease, i.e., point A on the curve.

EXAMPLE 3

Impulse Viscoelasticity Data: Reduced Cure Schedule For An Epoxy Resin

The procedure of Example 2 was repeated, except that the reduced cure schedule was carried out: 0.5 hours at 80° C. followed by 2 hours at 170° C. FIG. 3 represents the plot of equilibrium modulus and temperature as functions of time in minutes for the epoxy resin. FIG. 4 represents the steady state elongational viscosity and temperature curves.

As can be gleaned from FIGS. 1 to 4, a substantial "dead time" exists in the commercial cure at 2 hours at 80° C. followed by 3 hours at 150° C. The slope of the Eeq curve in FIG. 1 immediately prior to point A is approximately 0.06:1 and immediately after point A greater than 10:1. Cure does not begin to increase substantially until the temperature increased above 80° C. The slope in FIG. 3 prior to point A is approximately 0.02:1, after point A it climbs to over 3:1 After 1 hour cure at 170° C., the slope is about 0.05:1 and after 2 hours the slope is about 0.025:1 On the other hand, the impulse viscoelastic data, as represented by the equilibrium modulus curve and steady state viscoelastic data, for the reduced cure schedule shows a positive rate of cure through about the first 40 minutes with little or no "dead time". Essentially no cure is effected in the conventional cycle beyond point A until the temperature is increased. At final cure temperature the general trend of the curve is rather flat with the slope being less than about 0.1:1.

The physical properties of the epoxy cured at the reduced cure schedule are comparable to those obtained with the conventional commercial cure schedule.

EXAMPLE 4

Impulse Viscoelasticity Data: Reduced Cure Schedule with Isophoronediamine

The procedure of Example 2 was repeated except that isophoronediamine was substituted for the PACM containing cycloaliphatic amine curative. FIG. 3 is a plot of equilibrium modulus and temperature as functions of time. The initial slope is approximately zero. Near point A the temperature was increased on the basis that the equilibrum modulus increased somewhat. One probably could have waited until the slope ratios changed dramatically, but temperature was increased in anticipation of the slope change, slope change being shown more clearly by a plot using a conventional cure.

What is claimed is:

1. In a process for curing an epoxy resin by reacting a polyglycidyl ether of a polyhydric phenol with a cycloaliphatic polyamine curative wherein the ratio of polyglycidyl ether of a polyhydric phenol to polyamine curative is from 0.6–1.7 amine hydrogens per epoxide equivalent of polyglycidyl polyether of a polyhydric phenol, said cure being effected at an initial cure temperature and then gradually increased to a final elevated cure temperature, the improvement for reducing the cure time without significant reduction in ultimate physical properties which comprises:

effecting an initial and partial cure of the epoxy resin at a temperature between 60° and 100° C.;

increasing the temperature of the epoxy resin at a point when the ratio of the slope of the equilibrium modulus to the initial slope of the equilibrium modulus in megapascals plotted as a function of time in minutes for the curing epoxy resin as determined by the equation:

$$Eeq = \frac{\int_0^\infty \sigma(t)dt}{\int_0^\infty \epsilon(t)dt}$$

wherein Eeq is equilibrium modulus, $\sigma(t)$ is stress response, $\epsilon(t)$ is strain history, (t) is time and dt is time increment is greater than about 20:1 to a final cure temperature between about 160° and 200° C.; and, then maintaining a final cure temperature until the slope of said equilibrium modulus falls below about 0.1:1.

2. The process of claim 1 wherein the polyglycidyl ether of a polyhydric phenol is a glycidyl ether of bisphenol A.

3. The process of claim 2 wherein the temperature is raised within 10 minutes of the point where the ratio of the slope of the equilibrium modulus is greater than 100:1.

4. The process of claim 3 wherein the final cure temperature is from about 165° to 185° C.

5. The process of claim 4 wherein the cycloaliphatic polyamine curative comprises di(4-aminocyclohexyl)methane.

6. The process of claim 5 wherein the cycloaliphatic polyamine curative further comprises a poly(aminobenzyl-cyclohexylamine)methane mixture comprising:

2–10% di(4-aminocyclohexyl)methane;

0.5–2% 4-aminocyclohexyl-4-hydroxycyclohexyl methane;

5–17% 4-(4'-aminobenzyl)cyclohexylamine;

5–25% 2,4-di(4-aminocyclohexylmethyl)cyclohexylamine;

35–55% 2,4-di(4-aminocyclohexylmethyl)aniline;

0–15% 4,4'-di(4-cyclohexylmethyl)cyclohexylamine; and,

3–8% partially hydrogenated trimethylenetetraaniline and analogs thereof and the proportion of di(4-aminocyclohexyl)methane is from about 50–80 percent and the proportion of said poly(aminobenzyl-cyclohexylamine)methane mixture is from 20–50 percent, all percentages being by weight.

7. The process of claim 5 wherein the initial cure temperature is about 70°–90° C.

8. The process of claim 3 wherein the ratio of polyamine curative to polyglycidyl ether of a polyhydric phenol is 0.9–1.1 amine hydrogens per epoxide equivalent of polyglycidyl polyether of a polyhydric phenol.

9. The process of claim 3 wherein the cycloaliphatic polyamine is isophoronediamine.

10. In a process for curing an epoxy resin by reacting a polyglycidyl ether of a polyhydric phenol with a cycloaliphatic polyamine curative wherein the ratio of polyglycidyl ether of a polyhydric phenol to polyamine curative is from 0.6–1.7 amine hydrogens per epoxide equivalent of polyglycidyl ether of a polyhydric phenol, said cure being effected at an initial cure temperature and then gradually increased to a final elevated cure temperature, the improvement for reducing the cure time without significant reduction in ultimate physical properties which comprises:

effecting cure in the presence of a cycloaliphatic polyamine curative selected from the group consisting of di(4-aminocyclohexyl)methane, di(3-methyl-4-aminocyclohexyl)methane and isophoronediamine;

effecting an initial cure at a temperature of 70°–90° C. for about 20–40 minutes;

gradually increasing the temperature after initial cure to a final temperature from 165°–185° C., said temperature being increased at a rate of from 3°–20° C. per minute;

maintaining a final cure temperature of 165°–185° C. for about 0.5 to 2.5 hours.

11. The process of claim 10 wherein the polyglycidyl ether of a polyhydric phenol is a glycidyl ether of bisphenol A.

12. The process of claim 11 wherein the ratio of polyamine curative to polyglycidyl ether of a polyhydric phenol is 0.9–1.1 amine hydrogens per epoxide equivalent of polyglycidyl polyether of a polyhydric phenol.

13. The process of claim 12 wherein the cycloaliphatic polyamine is isophoronediamine.

14. The process of claim 12 wherein the cycloaliphatic polyamine curative comprises di(4-aminocyclohexyl)methane.

15. The process of claim 12 wherein the cycloaliphatic polyamine curative comprises di(3-methyl-4-aminocyclohexyl)methane.

* * * * *